US012134173B2

(12) United States Patent
Hietpas et al.

(10) Patent No.: US 12,134,173 B2
(45) Date of Patent: Nov. 5, 2024

(54) POWERED FASTENER DRIVER

(71) Applicant: MILWAUKEE ELECTRIC TOOL CORPORATION, Brookfield, WI (US)

(72) Inventors: Logan M. Hietpas, Glendale, WI (US); James Wekwert, Wauwatosa, WI (US); Matthew N. Thurin, Wausatosa, WI (US); John S. Scott, Brookfield, WI (US); Caroline Fox, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 615 days.

(21) Appl. No.: 17/046,166

(22) PCT Filed: Apr. 14, 2020

(86) PCT No.: PCT/US2020/028065
§ 371 (c)(1),
(2) Date: Oct. 8, 2020

(87) PCT Pub. No.: WO2020/214558
PCT Pub. Date: Oct. 22, 2020

(65) Prior Publication Data

US 2023/0150101 A1 May 18, 2023

Related U.S. Application Data

(60) Provisional application No. 62/835,243, filed on Apr. 17, 2019.

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/047; B25C 1/04; B25C 1/06; B25C 1/041; B25C 1/042; B25C 1/00; B25C 1/008

(Continued)

(56) References Cited

U.S. PATENT DOCUMENTS 3,259,292 A 7/1966 Maynard
3,427,928 A 2/1969 Bade
(Continued)

FOREIGN PATENT DOCUMENTS

DE 202013001537 U1 3/2013
EP 1674204 A1 6/2006
(Continued)

OTHER PUBLICATIONS

Extended European Search Report for Application No. 20790516.7 dated Sep. 22, 2022 (9 pages).

(Continued)

*Primary Examiner* — Veronica Martin
(74) *Attorney, Agent, or Firm* — Michael Best & Friedrich LLP

(57) ABSTRACT

A gas spring-powered fastener driver includes a first chamber, and a movable piston positioned within the first chamber. The fastener driver also includes a driver blade attached to the piston and movable therewith between a ready position and a driven position. The fastener driver further includes a second chamber containing pressurized gas. The second chamber is in fluid communication with the first chamber via a flow passage. The fastener driver also includes a throttle mechanism configured to throttle flow of the pressurized gas through the flow passage.

19 Claims, 9 Drawing Sheets

(58) Field of Classification Search
USPC ............................................. 227/130, 8, 156
See application file for complete search history.

(56) References Cited

U.S. PATENT DOCUMENTS 3,561,324 A * 2/1971 Obergfell ................ B25C 1/041 91/308
3,871,405 A 3/1975 Schwarz
3,895,562 A * 7/1975 El Guindy .............. F01L 25/06 91/308
4,523,646 A 6/1985 Doyle et al.
6,783,050 B2 8/2004 Ishizawa et al.
7,780,053 B2 * 8/2010 Wen .......................... B25C 1/04 239/296
8,763,874 B2 7/2014 McCardle et al.
10,016,884 B2 7/2018 Wu et al.
2004/0026477 A1 * 2/2004 Ishizawa ................. B25C 1/047 227/130
2009/0242604 A1 10/2009 Mina et al.
2011/0198381 A1 * 8/2011 McCardle ................. B25C 1/06 227/8
2016/0151900 A1 * 6/2016 Wu ......................... B25C 1/047 227/130

FOREIGN PATENT DOCUMENTS

EP 1625916 B1 11/2008
EP 2161103 A1 3/2010
EP 2161104 A1 3/2010
EP 3323557 A1 5/2018
JP 2010023168 A 2/2010
WO 2016158130 A1 10/2016
WO 2017215860 A1 12/2017

OTHER PUBLICATIONS

International Search Report and Written Opinion for Application No. PCT/US2020/028065 dated Jul. 27, 2020 (9 pages).

* cited by examiner

POWERED FASTENER DRIVER

CROSS-REFERENCE TO RELATED APPLICATIONS

This application is a national phase filing under 35 U.S.C. 371 of International Application No. PCT/US2020/028065, filed Apr. 14, 2020, which claims priority to U.S. Provisional Patent Application No. 62/835,243, filed Apr. 17, 2019, the entire contents of which are hereby incorporated by reference.

FIELD OF THE INVENTION

The present invention relates to power tools, and more particularly to powered fastener drivers adapted to drive fasteners into a workpiece.

BACKGROUND OF THE INVENTION

There are various fastener drivers known in the art for driving fasteners (e.g., nails, tacks, staples, etc.) into a workpiece. These fastener drivers operate utilizing various means known in the art (e.g. compressed air generated by an air compressor, electrical energy, a flywheel mechanism, etc.), but often these designs are met with power, size, and cost constraints.

SUMMARY OF THE INVENTION

The present invention provides, in one aspect, a gas spring-powered fastener driver. The fastener driver includes a first chamber, and a movable piston positioned within the first chamber. The fastener driver also includes a driver blade attached to the piston and movable therewith between a ready position and a driven position. The fastener driver further includes a second chamber containing pressurized gas. The second chamber is in fluid communication with the first chamber via a flow passage. The fastener driver also includes a throttle mechanism configured to throttle flow of the pressurized gas through the flow passage.

The present invention provides, in another aspect, a gas spring-powered fastener driver. The fastener driver includes a first cylinder defining a first chamber, and a movable piston positioned within the first chamber. The fastener driver also includes a driver blade attached to the piston and movable therewith between a ready position and a driven position. The fastener driver further includes a second cylinder surrounding the first cylinder, and a second chamber defined between the first cylinder and the second cylinder and containing pressurized gas. The second chamber is in fluid communication with the first chamber via a flow passage. The fastener driver also includes a throttle mechanism configured to throttle flow of pressurized gas through the flow passage. The throttle mechanism includes a baffle configured to selectively adjust an area of the flow passage.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-6 illustrate a power tool, such as a gas spring-powered fastener driver 10, operable to drive fasteners (e.g., nails, tacks, staples, etc.) held within a magazine 12 into a workpiece. In the illustrated embodiment, the fastener driver 10 is configured as a multi-shot powered nailer including the magazine 12 holding a collated strip of fasteners, allowing the user to perform multiple fastening operations without having to manually reload the fastener driver 10 after each driving cycle. The gas spring-powered fastener driver 10 includes a gas spring assembly 14 for generating a motive force to drive each fastener into the workpiece. The gas spring assembly 14 includes a throttle mechanism 16 (FIGS. 7-10C) for varying the power output of the fastener driver 10 when performing a fastener driving operation, as will be described in further detail below.

Figure 3:
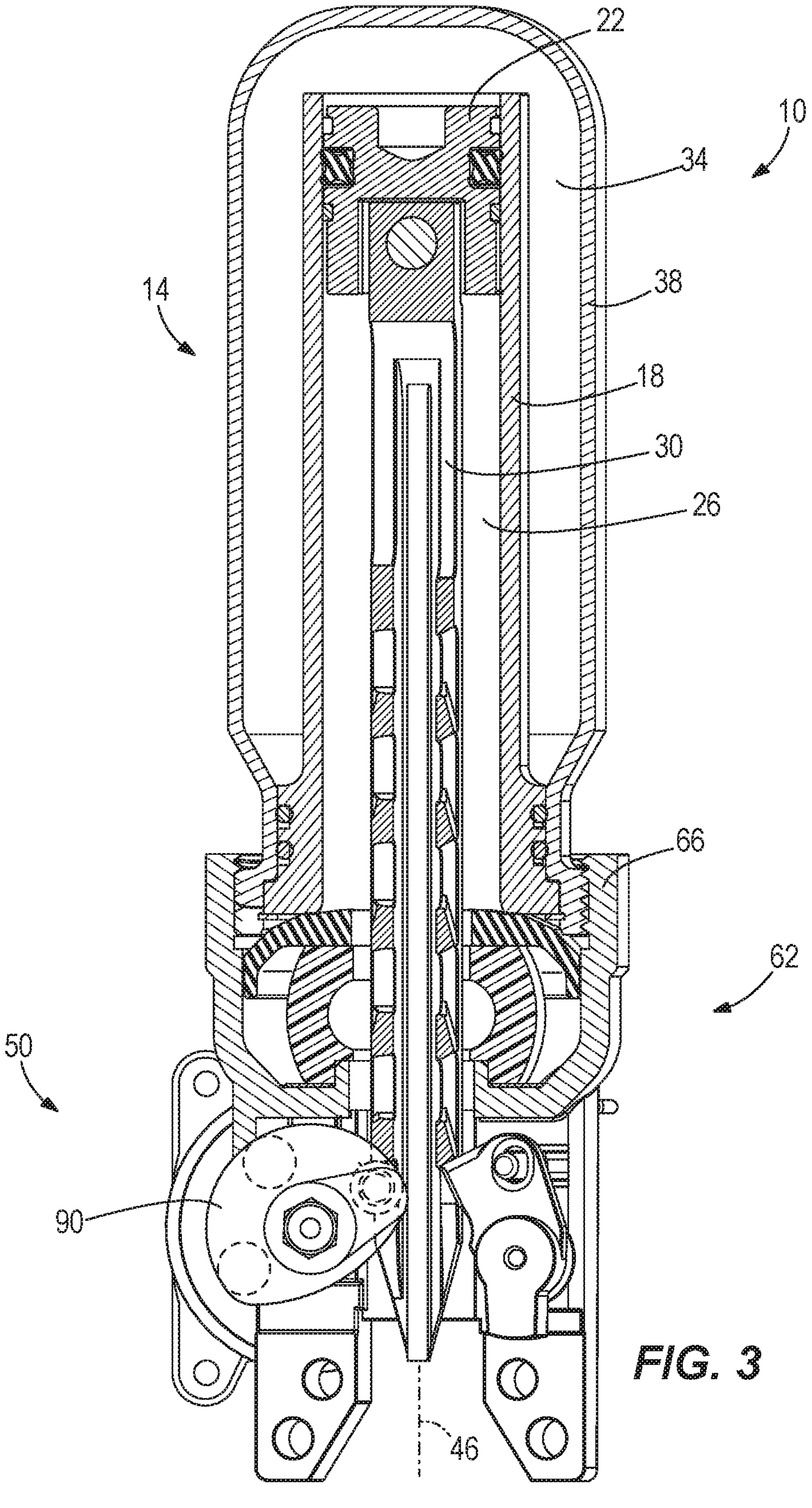
FIG. 3 is a cross-sectional view of the fastener driver of FIG. 1 taken along line 3-3 of FIG. 2, illustrating a driver blade in a ready position.
Figure 4:
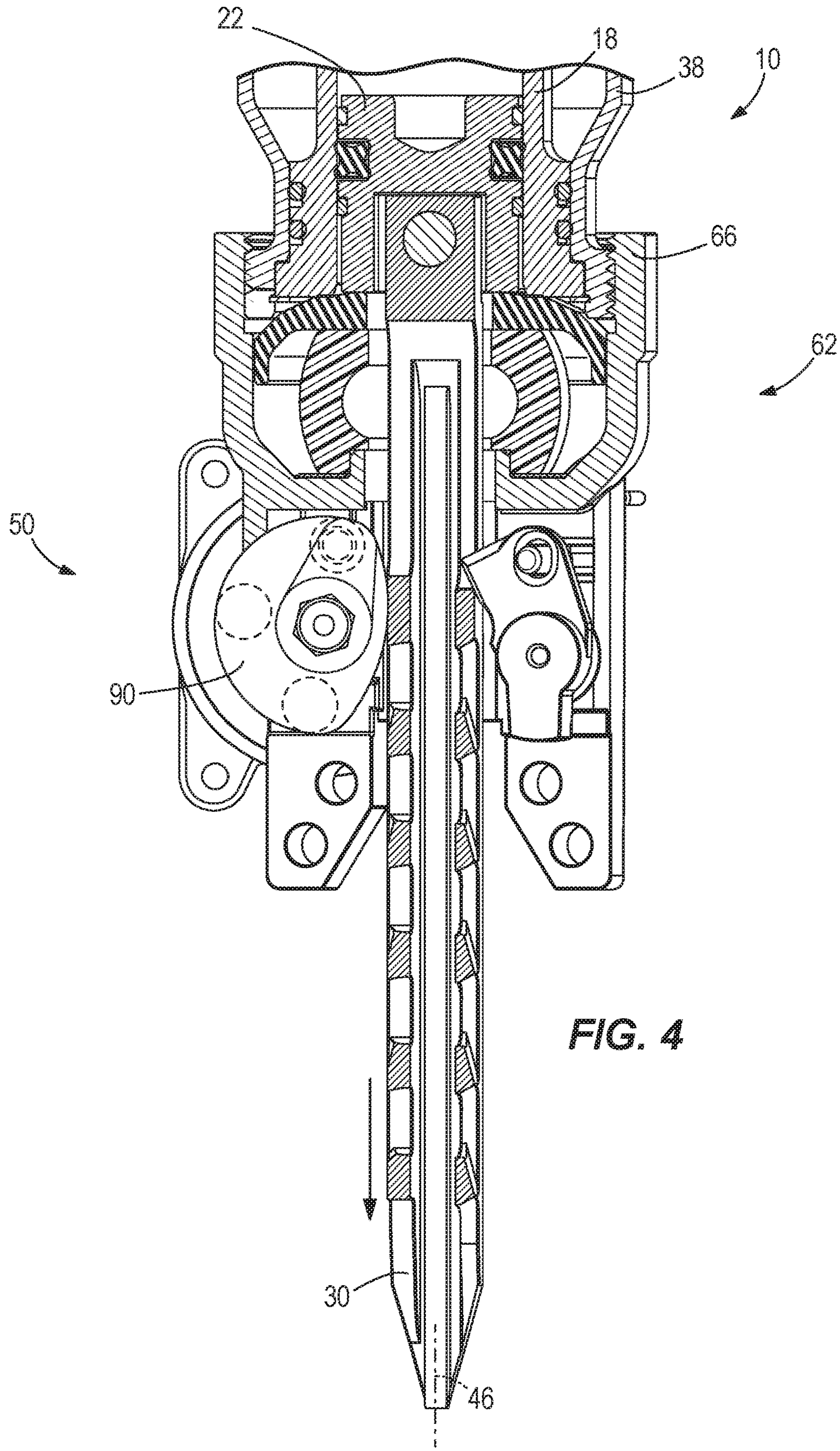
FIG. 4 is a cross-sectional view of the fastener driver of FIG. 1 taken along line 3-3 of FIG. 2, illustrating the driver blade in a driven position.

With reference to FIGS. 3 and 4, the gas spring assembly 14 includes an inner cylinder 18 and a moveable piston 22 positioned for reciprocating movement within an inner chamber 26 bounded by the inner cylinder 18. The fastener driver 10 further includes a driver blade 30 that is attached to the piston 22 and moveable therewith. The fastener driver 10 does not require an external source of air pressure, but rather includes a storage chamber 34 filled with pressurized gas and positioned in fluid communication with the inner chamber 26. The gas spring assembly 14 also includes an outer cylinder 38 positioned about the inner cylinder 18. The storage chamber 34 is defined between the inner cylinder 18 and the outer cylinder 38. In the illustrated embodiment, the inner cylinder 18 and moveable piston 22 are positioned within the outer cylinder 38.

Figure 5:
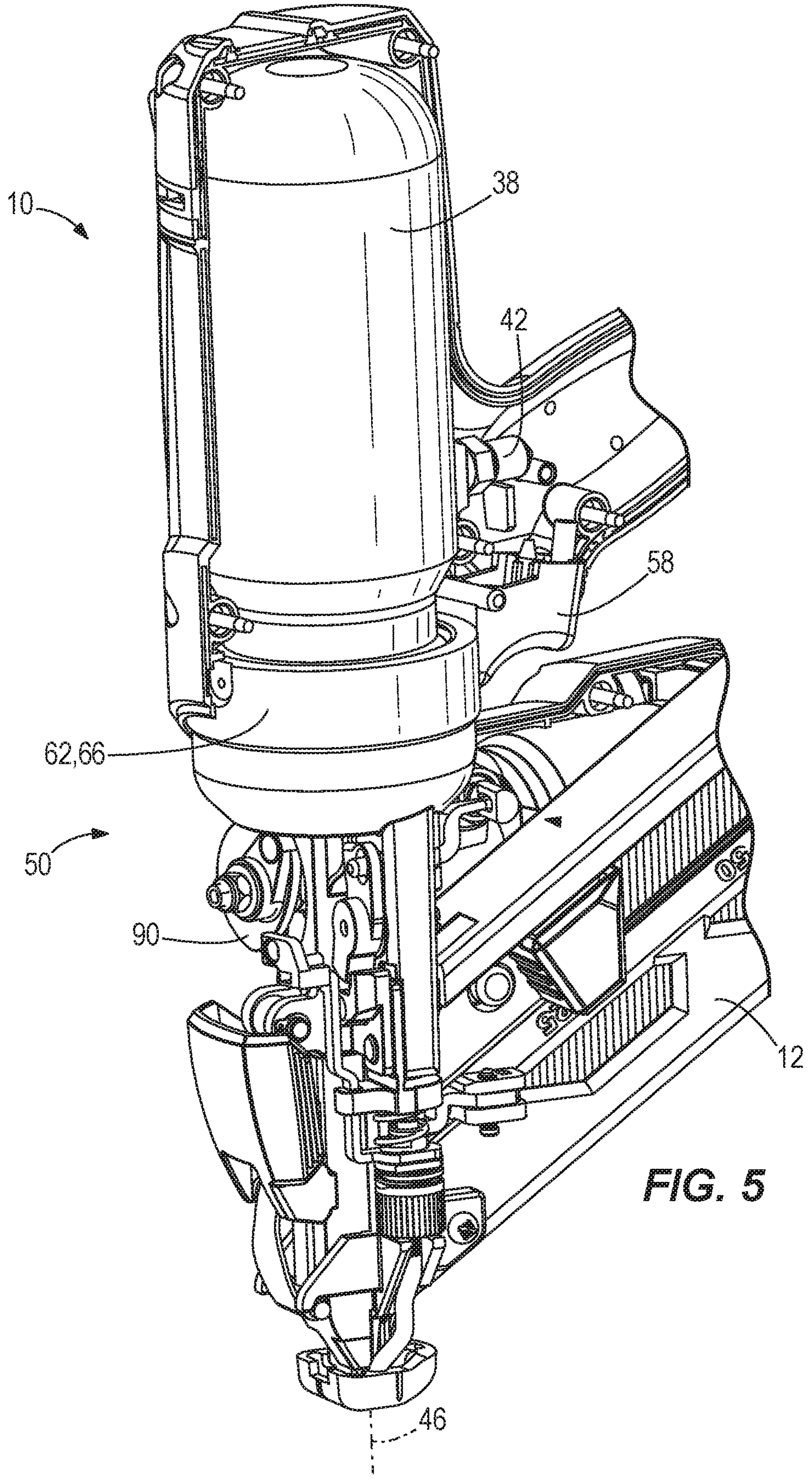
FIG. 5 is a partial cut-away view of the fastener driver of FIG. 1.

With reference to FIG. 5, the driver 10 further includes a fill valve 42 coupled to the outer cylinder 38. When connected with a source of compressed gas, the fill valve 42 permits the storage chamber 34 to be refilled with compressed gas if any prior leakage has occurred. The fill valve 42 may be configured as a Schrader valve, for example.

The inner cylinder 18 and the driver blade 30 define a driving axis 46, and during a driving cycle the driver blade 30 and piston 22 are moveable between a ready position (i.e., top dead center; see FIG. 3) and a driven position (i.e., bottom dead center; see FIG. 4). The fastener driver 10 further includes a lifting assembly 50, which is powered by a motor 54 (FIG. 6), and which is operable to move the driver blade 30 from the driven position to the ready position.

Figure 1:
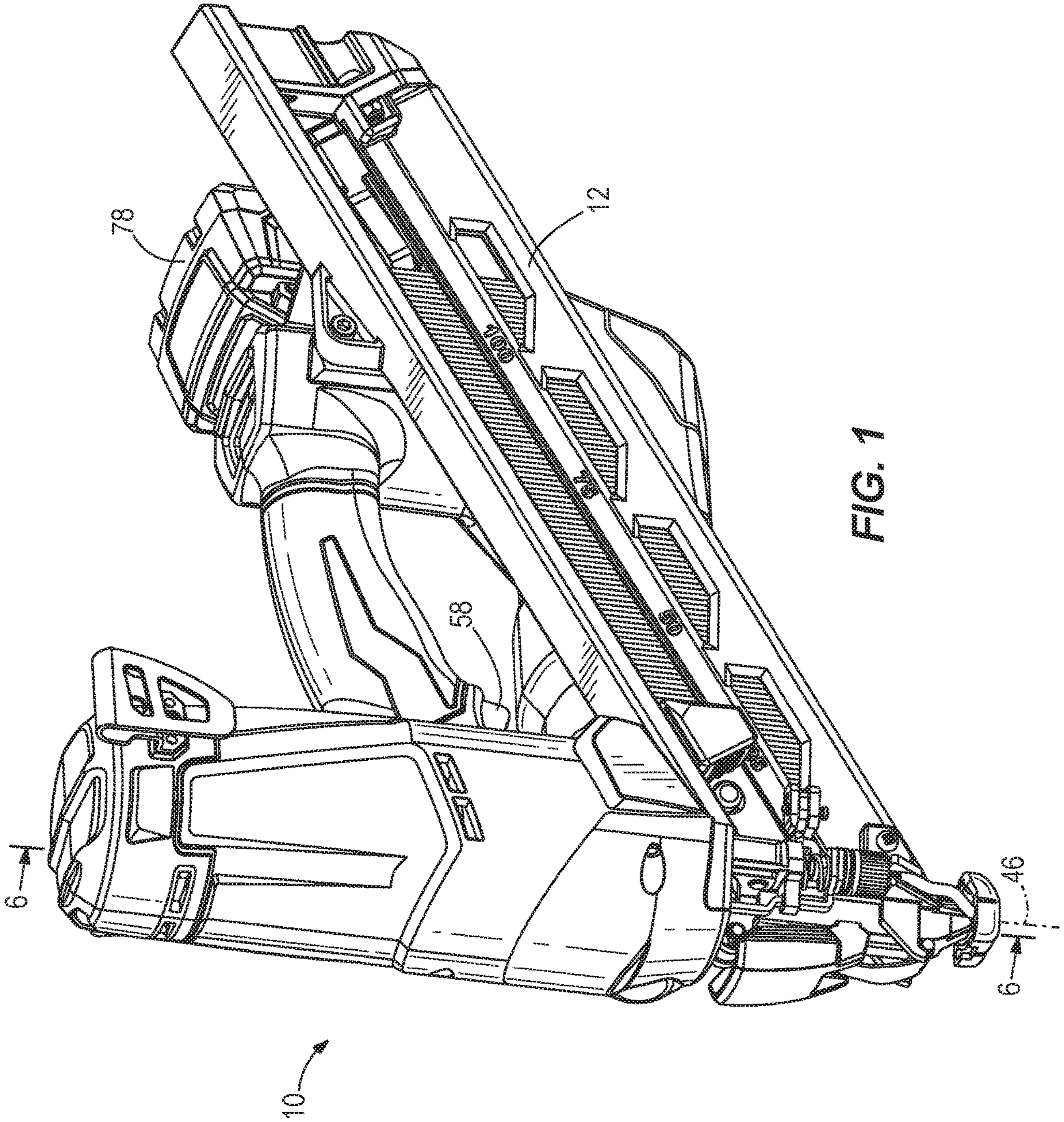
FIG. 1 is a perspective view of a gas spring-powered fastener driver in accordance with an embodiment of the invention.
Figure 2:
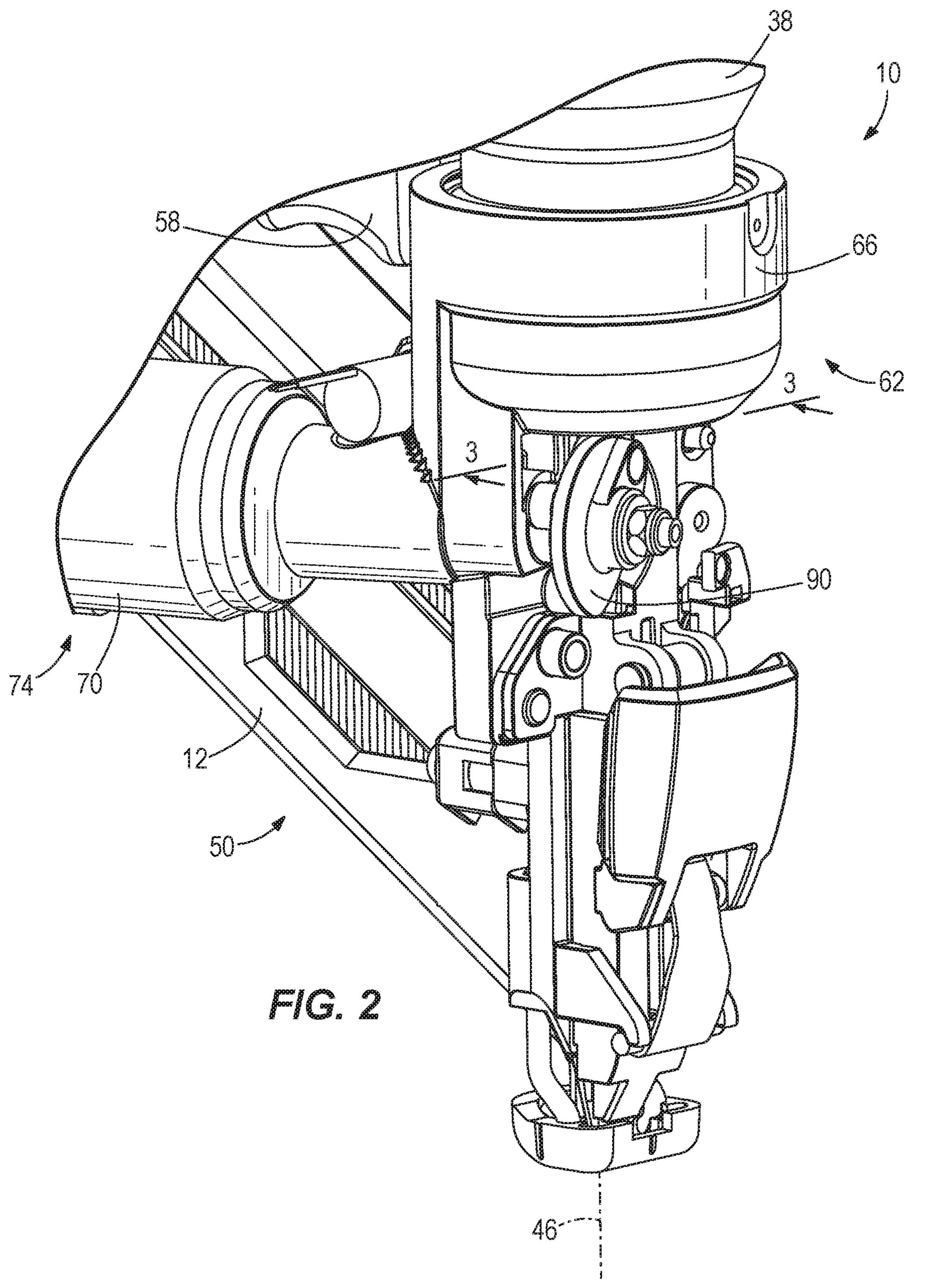
FIG. 2 is a partial cut-away view of the fastener driver of FIG. 1.

In operation, the lifting assembly 50 drives the piston 22 and the driver blade 30 to the ready position by energizing the motor 54. As the piston 22 and the driver blade 30 are driven to the ready position, the gas above the piston 22 and the gas within the storage chamber 34 is compressed. Once in the ready position, the piston 22 and the driver blade 30 are held in position until being released by user activation of a trigger 58 (FIG. 1). When released, the compressed gas above the piston 22 and within the storage chamber 34 drives the piston 22 and the driver blade 30 to the driven position, thereby driving the fastener into a workpiece. The illustrated fastener driver 10 therefore operates on a gas spring principle utilizing the lifting assembly 50 and the piston 22 to compress the gas within the inner chamber 26 and the storage chamber 34. Further detail regarding the structure and operation of the fastener driver 10 is provided below.

With reference to FIGS. 4 and 5, the fastener driver 10 includes a housing 62 having a cylinder support portion 66 (FIG. 3) in which the outer cylinder 38 is at least partially positioned, and a transmission housing portion 70 in which a transmission 74 (FIG. 6) is at least partially positioned. The transmission 74 is a component of the lifting assembly 50, which raises the driver blade 30 from the driven position to the ready position. The motor 54 is also a component of the lifting assembly 50 and is coupled to the transmission housing portion 70 for providing torque to the transmission 74 when activated. A battery pack 78 (FIG. 1) is electrically connectable to the motor 54 for supplying electrical power to the motor 54. In alternative embodiments, the driver may be powered from an AC voltage input (i.e., from a wall outlet), or by an alternative DC voltage input (e.g., a DC power support).

Figure 6:
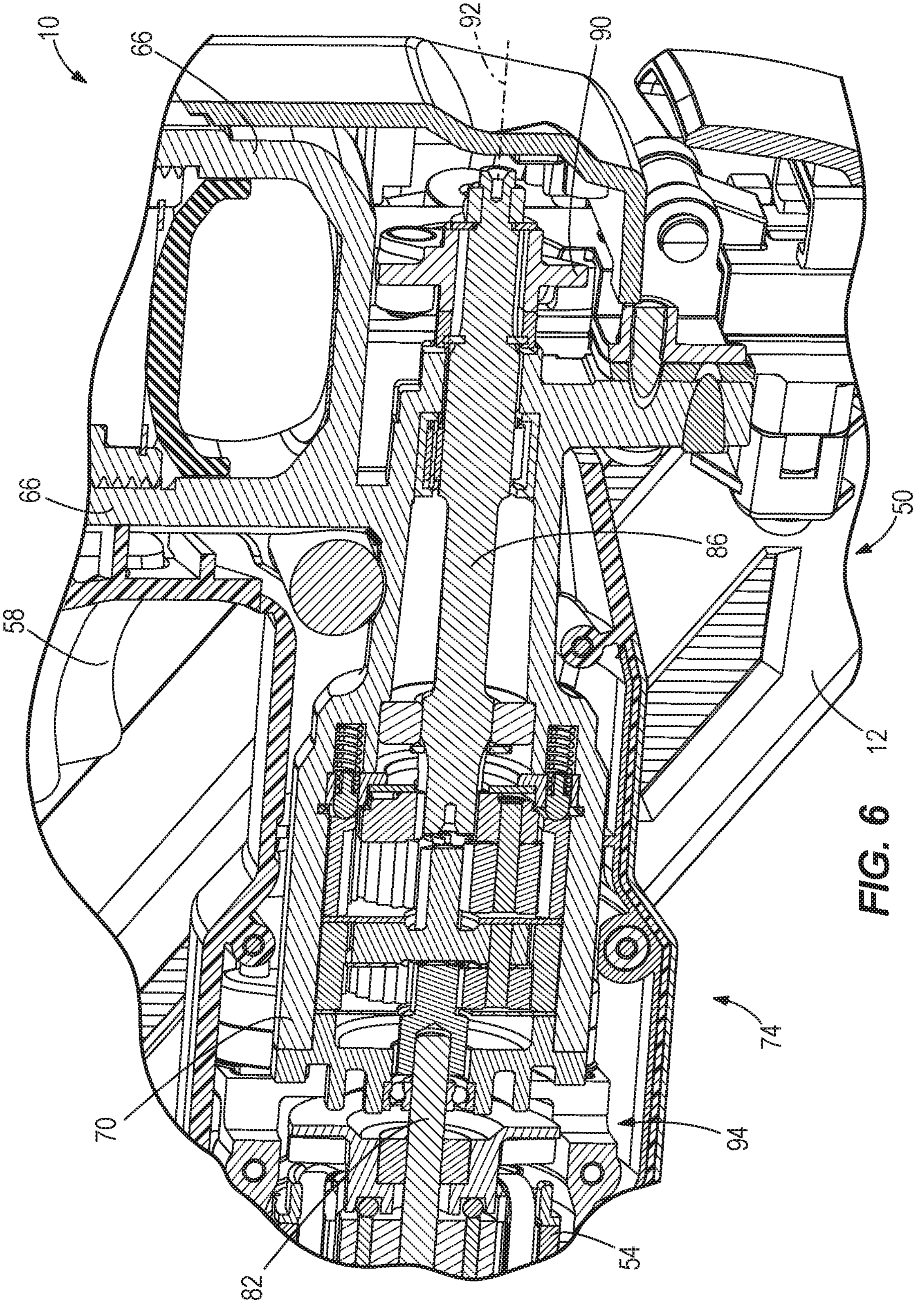
FIG. 6 is a cross-sectional view of the fastener driver of FIG. 1 taken along line 6-6 of FIG. 1, illustrating a motor, a transmission, and a fan assembly.
Figure 7:
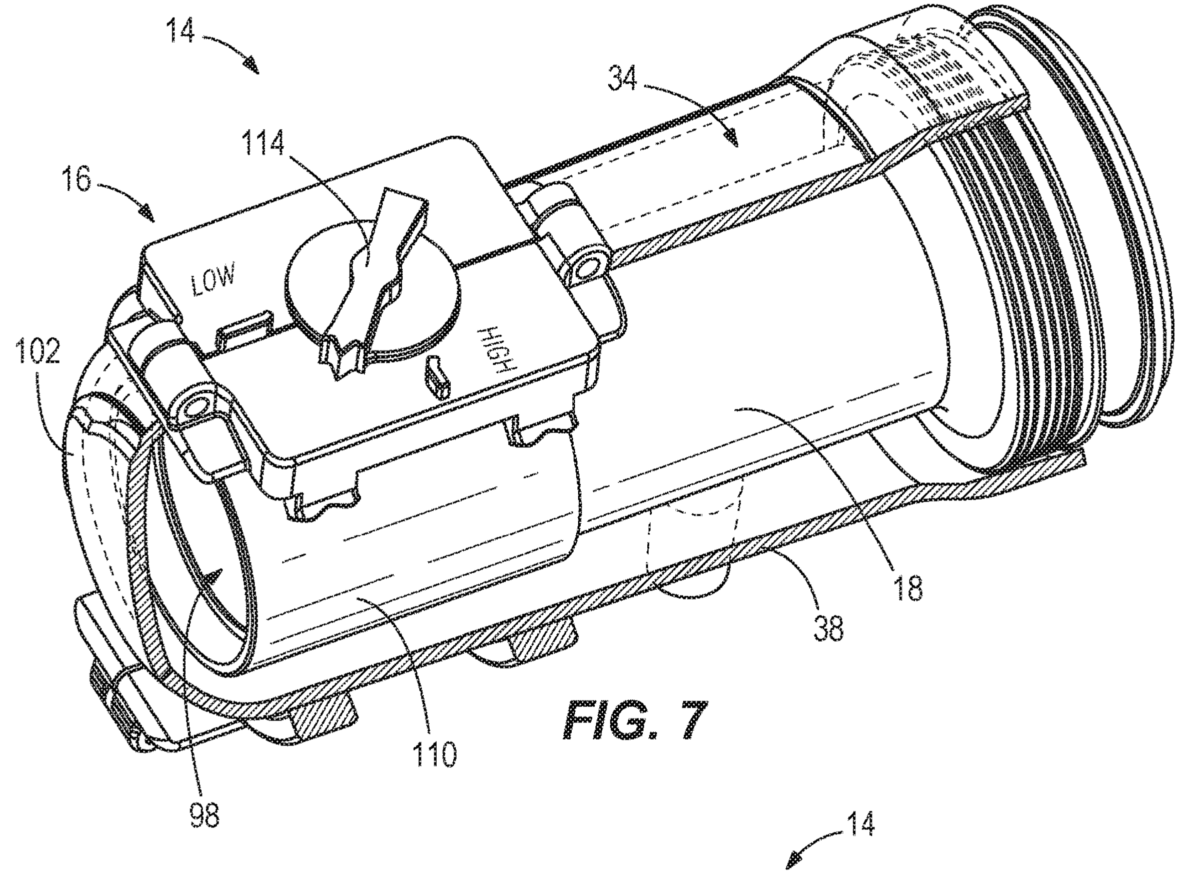
FIG. 7 is a perspective view of a throttle mechanism of the fastener driver of FIG. 1.
Figure 8:
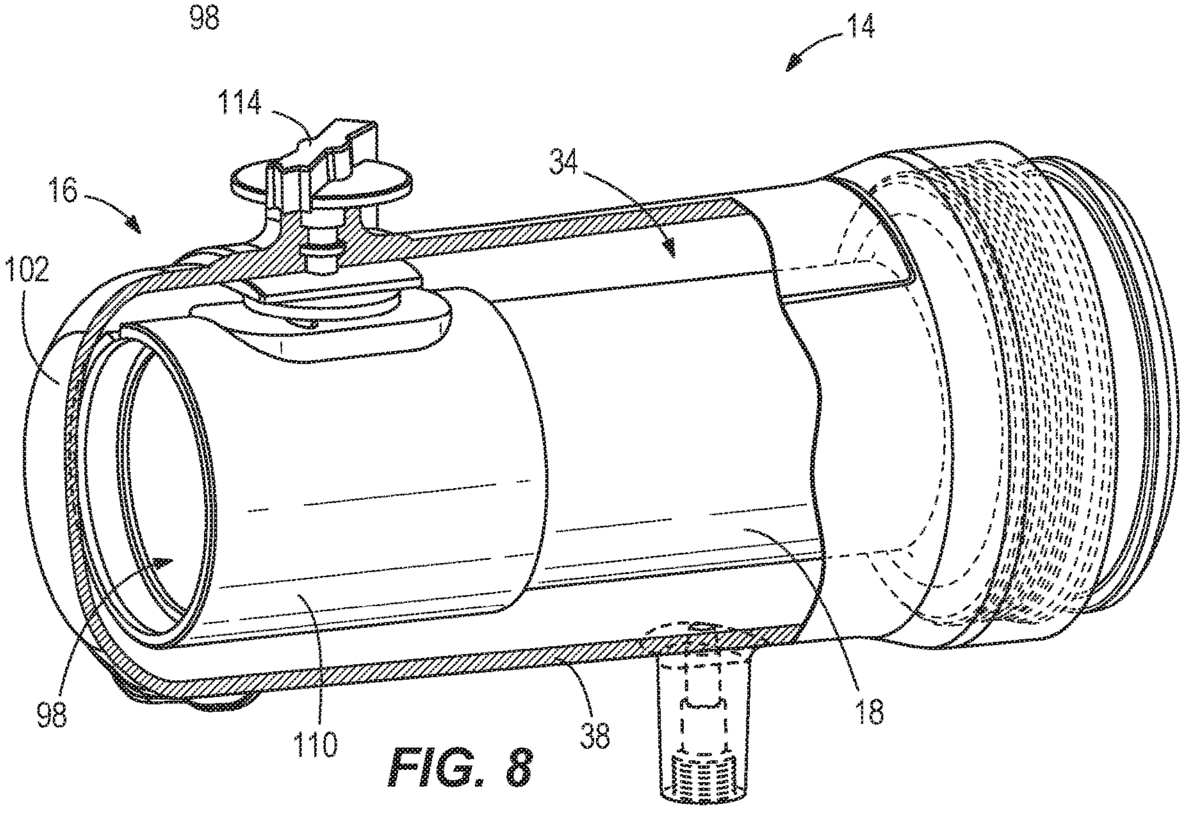
FIG. 8 is another perspective view of the throttle mechanism of FIG. 7 with portions removed.

With reference to FIG. 6, the transmission 74 receives torque from the motor 54 via a motor output shaft 82, and includes a transmission output shaft 86 to which a lifter 90 of the lifting assembly 50 is rotationally affixed (FIGS. 5 and 6). The transmission 74 provides torque to the lifter 90, causing the lifter 90 to rotate about an axis 92 (FIG. 6) and return the driver blade 30 from the driven position to the ready position. A fan 94 is rotatably coupled to the motor shaft 82 to generate cooling airflow within an interior of the fastener driver 10.

With reference to FIGS. 7-10C, the gas spring assembly 14 will now be described in further detail. The inner cylinder 18 includes an open end 98 that fluidly communicates with the storage chamber 34. An end portion 102 of the outer cylinder 38 is located adjacent the open end 98 and substantially surrounds the open end 98. A flow passage 106 is defined between the open end 98 and the end portion 102, and fluidly connects the inner chamber 26 with the storage chamber 34. The pressurized gas flows between the inner chamber 26 and the storage chamber 34 via the flow passage 106.

The gas spring assembly 14 further includes the throttle mechanism 16 that selectively increases or reduces an area of the flow passage 106 to throttle the flow of pressurized gas between the inner chamber 26 and the storage chamber 34. The throttle mechanism 16 includes a sliding sleeve or baffle 110 that surrounds the inner cylinder 18 adjacent the open end 98. The baffle 110 is slidable in an axial direction relative to the inner cylinder 18, so that a portion of the baffle 110 may extend beyond the open end 98 and into the flow passage 106. As the baffle 110 slides beyond the open end 98 (e.g., FIG. 10C), it obstructs and effectively reduces the area of the flow passage 106, thereby inhibiting the flow of pressurized gas between the inner chamber 26 and the storage chamber 34. The baffle 110 is movable between a no-choke position (FIGS. 9A and 10A) corresponding to a highest power output of the fastener driver 10, a choked position (FIGS. 9C and 10C) corresponding to a lowest power output, and one or more partially-choked positions (FIGS. 9B and 10B) corresponding to an intermediate power output.

A control knob 114 is coupled to the baffle 110 via a scotch-yoke mechanism 118 and is operable to slide the baffle 110 in the axial direction relative to the inner cylinder 18. The scotch-yoke mechanism 118 includes an eccentric pin 122 coupled to the control knob 114 and rotatable therewith. The eccentric pin 122 engages a slot 126 formed in the baffle 110. As the control knob 114 rotates between the no-choke position (FIG. 10A) and the choked position (FIG. 10C), the eccentric pin 122 engages the slot 126 to adjust the axial position of the baffle 110 relative to the inner cylinder 18.

Figure 9A:
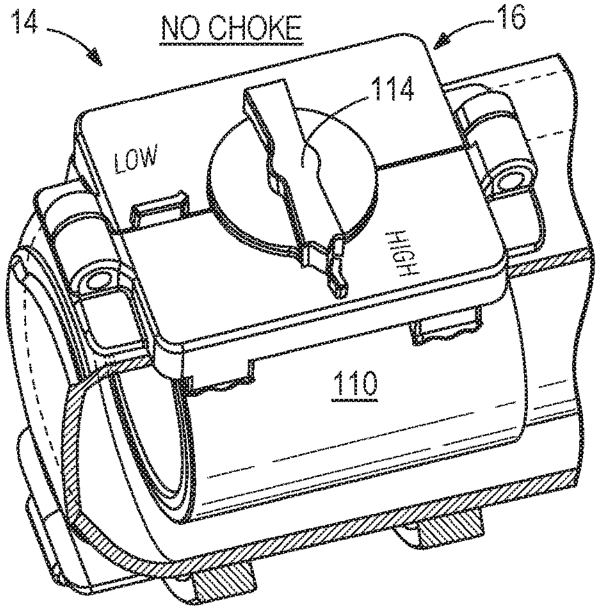
FIG. 9A is a partial perspective view of the throttle mechanism of FIG. 7 adjusted to a no-choke position.
Figure 9B:
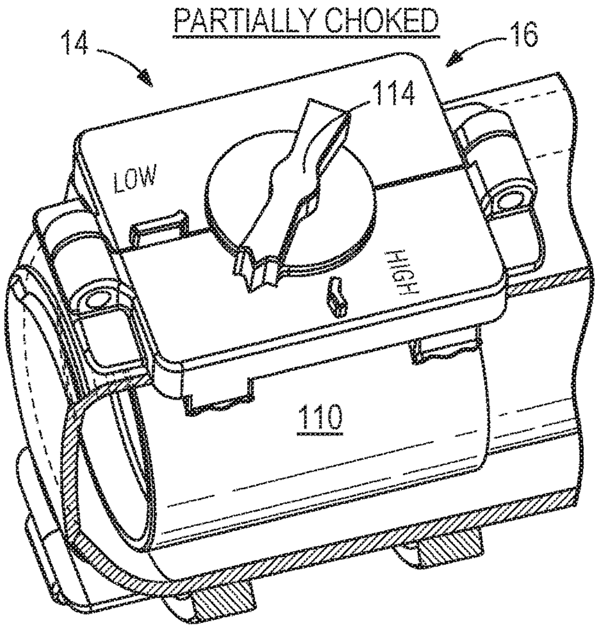
FIG. 9B is a partial perspective view of the throttle mechanism of FIG. 7 adjusted to a partial-choke position.
Figure 10A:
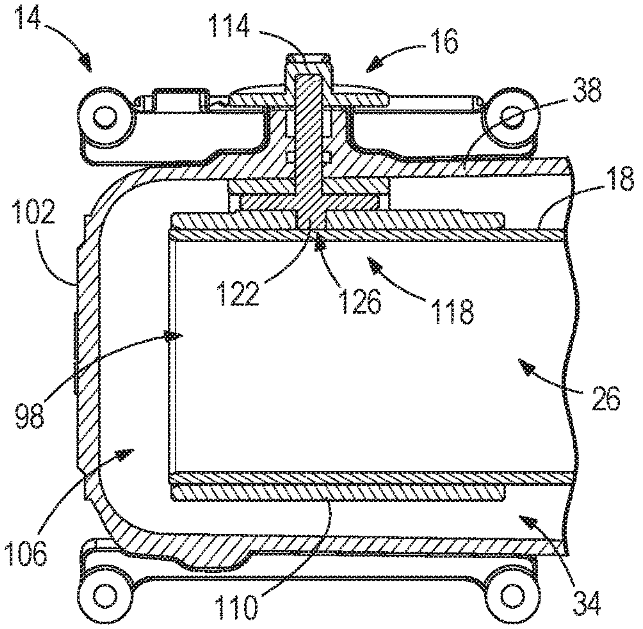
FIG. 10A is a cross-sectional view of the throttle mechanism of FIG. 9A.
Figure 10B:
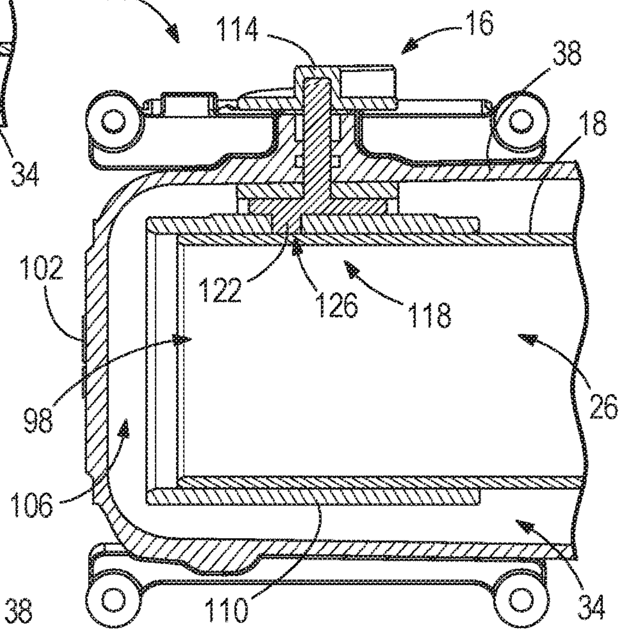
FIG. 10B is a cross-sectional view of the throttle mechanism of FIG. 9B.

In operation, the control knob 114 is adjusted to select an appropriate choke position for the throttle mechanism 16, based on a given fastener driving application. For example, if the given fastener driving application requires a relatively high power output (e.g., for driving fasteners into relatively harder workpieces such as masonry, concrete, etc.), the control knob 114 is rotated to the no-choke position (FIGS. 9A and 10A). The eccentric pin 122 engages the slot 126 to move the baffle 110 away from the flow passage 106, such that the baffle 110 vacates the flow passage 106 and does not extend beyond the open end 98. When a fastener driving sequence is initiated, the compressed gas within the storage chamber 34 flows relatively rapidly through the flow passage 106 unimpeded by the baffle 110, resulting in the highest power output for the fastener driver 10. The compressed gas drives the piston 22 and the driver blade 30 to the driven position, thereby driving the fastener into the workpiece.

Figure 9C:
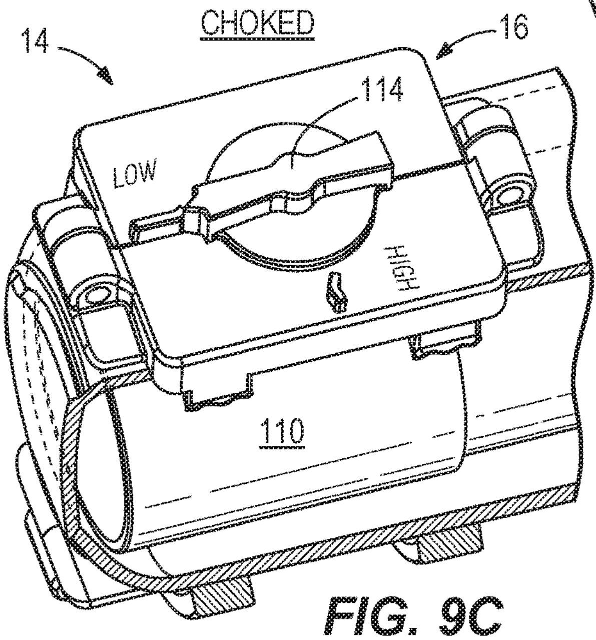
FIG. 9C is a partial perspective view of the throttle mechanism of FIG. 7 adjusted to a choked position.
Figure 10C:
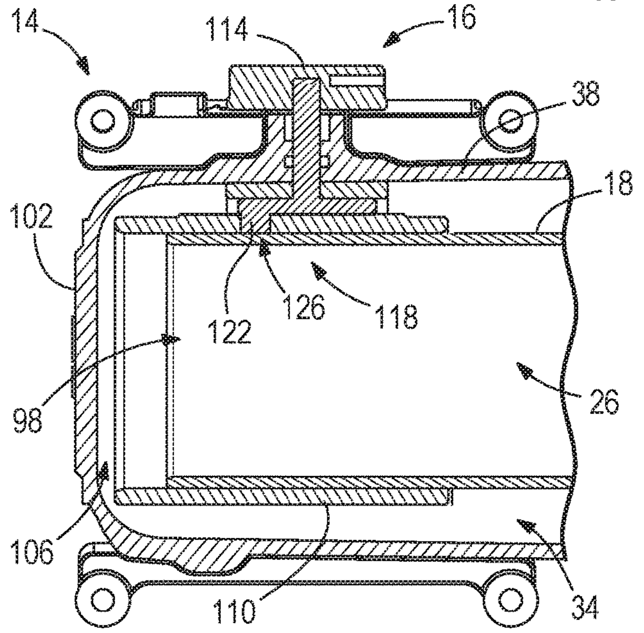
FIG. 10C is a cross-sectional view of the throttle mechanism of FIG. 9C.

If a subsequent fastener driving application requires a relatively low power output (e.g., for driving fasteners into relatively softer workpieces such as softwood products, engineered wood products, etc.), the control knob 114 is rotated to the full choke position (FIGS. 9C and 10C). The eccentric pin 122 engages the slot 126 to move the baffle 110 toward the flow passage 106, such that the baffle 110 extends beyond the open end 98 and constricts the flow passage 106. When a fastener driving sequence is initiated, the compressed gas within the storage chamber 34 flows relatively slowly through the flow passage 106, which is constricted by the baffle 110, resulting in the lowest power output for the fastener driver 10. The compressed gas drives the piston 22 and the driver blade 30 to the driven position, thereby driving the fastener into the workpiece.

If an intermediate power output is desired, the control knob 114 can be rotated to any intermediate position between the no-choke position and the choked position. In some embodiments of the fastener driver 10, a detent mechanism may be used with the control knob 114 to define a plurality of predefined rotational positions of the control knob 114 coinciding with the no-choke position, the choked position, and one or more intermediate positions.

Although the invention has been described in detail with reference to certain preferred embodiments, variations and modifications exist within the scope and spirit of one or more independent aspects of the invention as described.

Various features of the invention are set forth in the following claims.

What is claimed is:

1. A gas spring-powered fastener driver comprising:
- a first cylinder defining a first chamber;
- a movable piston positioned within the first chamber;
- a driver blade attached to the piston and movable therewith between a ready position and a driven position;
- a second cylinder surrounding the first cylinder;
- a second chamber defined between the first cylinder and the second cylinder and containing pressurized gas, the second chamber being in fluid communication with the first chamber via a flow passage;
- a lifter mechanism configured to move the driver blade and the movable piston from the driven position to the ready position to compress the pressurized gas; and
- a throttle mechanism configured to throttle flow of the pressurized gas through the flow passage, the throttle mechanism including a baffle configured to selectively adjust an area of the flow passage;
- wherein the first cylinder defines an open end that communicates with the second chamber, and the flow passage is defined between the open end of the first cylinder and an end portion of the second cylinder; and
- wherein the baffle is configured as a sliding sleeve that surrounds the open end of the first cylinder and the baffle slides along the first cylinder.

2. The gas spring-powered fastener driver of claim 1, wherein the sliding sleeve extends beyond the open end of the first cylinder in a choked position of the throttle mechanism.

3. The gas spring-powered fastener driver of claim 1, further comprising a control knob coupled to the baffle and operable to slide the baffle relative to the first cylinder.

4. The gas spring-powered fastener driver of claim 3, further comprising a scotch-yoke mechanism including an eccentric pin coupled to the control knob and configured to engage a slot formed in the baffle.

5. The gas spring-powered fastener driver of claim 1, wherein the baffle inhibits flow of pressurized gas between the second chamber and the first chamber.

6. The gas spring-powered fastener driver of claim 1, wherein the baffle is movable between a no-choke position corresponding to a highest power output of the fastener driver, and a choked position corresponding to a lowest power output of the fastener driver.

7. The gas spring-powered fastener driver of claim 6, wherein the baffle is further movable to a partially-choked position corresponding to an intermediate power output of the fastener driver.

8. The gas spring-powered fastener driver of claim 1, further comprising a fill valve coupled to the outer cylinder.

9. The gas spring-powered fastener driver of claim 1, wherein the sliding sleeve is supported around the first cylinder in a no-choke position of the throttle mechanism, and wherein the sliding sleeve does not extend beyond the open end of the first cylinder in the no-choke position.

10. A gas spring-powered fastener driver comprising:
- a first cylinder defining a first chamber;
- a movable piston positioned within the first chamber;
- a driver blade attached to the piston and movable therewith between a ready position and a driven position;
- a second cylinder surrounding the first cylinder;
- a second chamber defined between the first cylinder and the second cylinder and containing pressurized gas, the second chamber being in fluid communication with the first chamber via a flow passage;
- a lifter mechanism configured to move the driver blade and the movable piston from the driven position to the ready position to compress the pressurized gas; and
- a throttle mechanism configured to throttle flow of the pressurized gas through the flow passage, the throttle mechanism including a baffle configured to selectively adjust an area of the flow passage;
- wherein the baffle is movable between a no-choke position corresponding to a highest power output of the fastener driver, in which the baffle is maintained in the no-choke position during a fastener driving sequence as the pressurized gas flows through the flow passage unimpeded by the baffle, and a choked position corresponding to a lowest power output of the fastener driver, in which the baffle is maintained in the choked position during a fastener driving sequence as the pressurized gas flows through the flow passage constricted by the baffle.

11. The gas spring-powered fastener driver of claim 10, wherein the first cylinder defines an open end that communicates with the second chamber, and the flow passage is defined between the open end of the first cylinder and an end portion of the second cylinder.

12. The gas spring-powered fastener driver of claim 11, wherein the baffle is configured as a sliding sleeve supported around the first cylinder adjacent the open end.

13. The gas spring-powered fastener driver of claim 12, wherein the sliding sleeve extends beyond the open end of the first cylinder in a choked position of the throttle mechanism.

14. The gas spring-powered fastener driver of claim 10, further comprising a control knob coupled to the baffle and operable to slide the baffle relative to the first cylinder.

15. The gas spring-powered fastener driver of claim 14, further comprising a scotch-yoke mechanism including an eccentric pin coupled to the control knob and configured to engage a slot formed in the baffle.

16. The gas spring-powered fastener driver of claim 10, wherein the baffle inhibits flow of pressurized gas between the second chamber and the first chamber.

17. The gas spring-powered fastener driver of claim 10, wherein the baffle is further movable to a partially-choked position corresponding to an intermediate power output of the fastener driver, the pressurized gas flows through the flow passage constricted by the baffle.

18. The gas spring-powered fastener driver of claim 10, further comprising a fill valve coupled to the outer cylinder.

19. The gas spring-powered fastener driver of claim 12, wherein the sliding sleeve is supported around the first cylinder in a no-choke position of the throttle mechanism, and wherein the sliding sleeve does not extend beyond the open end of the first cylinder in the no-choke position.

* * * * *